(12) United States Patent
Van Der Tol

(10) Patent No.: US 8,919,283 B2
(45) Date of Patent: Dec. 30, 2014

(54) DEVICE, METHOD AND COMPUTER PROGRAM PRODUCT FOR MILKING ANIMALS

(75) Inventor: Patrick Philip Jacob Van Der Tol, Amersfoort (NL)

(73) Assignee: Lely Patent N.V., Maassluis (NL)

( * ) Notice: Subject to any disclaimer, the term of this patent is extended or adjusted under 35 U.S.C. 154(b) by 247 days.

(21) Appl. No.: 13/387,554

(22) PCT Filed: Jul. 9, 2010

(86) PCT No.: PCT/NL2010/000106
§ 371 (c)(1), (2), (4) Date: Jan. 27, 2012

(87) PCT Pub. No.: WO2011/014061
PCT Pub. Date: Feb. 3, 2011

(65) Prior Publication Data
US 2012/0118236 A1 May 17, 2012

(30) Foreign Application Priority Data
Jul. 29, 2009 (NL) ..................................... 1037157

(51) Int. Cl.
*A01J 5/00* (2006.01)
*A01J 5/013* (2006.01)
*A01J 5/007* (2006.01)

(52) U.S. Cl.
CPC . *A01J 5/007* (2013.01); *A01J 5/013* (2013.01)
USPC ....................................................... 119/14.08

(58) Field of Classification Search
CPC .................................. A01J 5/007; A01J 5/013
USPC .......... 119/14.01, 14.02, 14.08, 14.17, 14.18, 119/14.14, 14.15
See application file for complete search history.

(56) References Cited

U.S. PATENT DOCUMENTS

| 4,612,537 | A | * | 9/1986 | Maltais et al. ................. 340/596 |
| 5,416,417 | A | * | 5/1995 | Peles .............................. 324/439 |
| 5,568,788 | A | * | 10/1996 | van den Berg et al. ..... 119/14.02 |
| 5,746,153 | A | * | 5/1998 | Hoefelmayr ............... 119/14.01 |

(Continued)

FOREIGN PATENT DOCUMENTS

WO    2005 006849    1/2005

OTHER PUBLICATIONS

International Search Report Issued Oct. 7, 2010 in PCT/NL10/00106 Filed Jul. 9, 2010.

*Primary Examiner* — Rob Swiatek
*Assistant Examiner* — Ebony Evans
(74) *Attorney, Agent, or Firm* — Oblon, Spivak, McClelland, Maier & Neustadt, L.L.P.

(57) ABSTRACT

The invention provides a device and method for milking a dairy animal, comprising at least two sensors for measuring milking parameters. Usually, an alarm is generated if a specific number of parameters each are outside a given range. According to the invention, now an alarm is also generated if said specific number of exceedings is not achieved, but if another, and usually greater, number of parameters each are within a larger, more flexible, range. As a result thereof, the actual alarm parameters with 'hard' limits can be selected, in order that false-positive messages are prevented to a considerable extent. In the grey area of almost exceeding, an alarm can still be generated if sufficient parameters are in dubious areas.

11 Claims, 3 Drawing Sheets

(56) References Cited

U.S. PATENT DOCUMENTS

Figure 1:
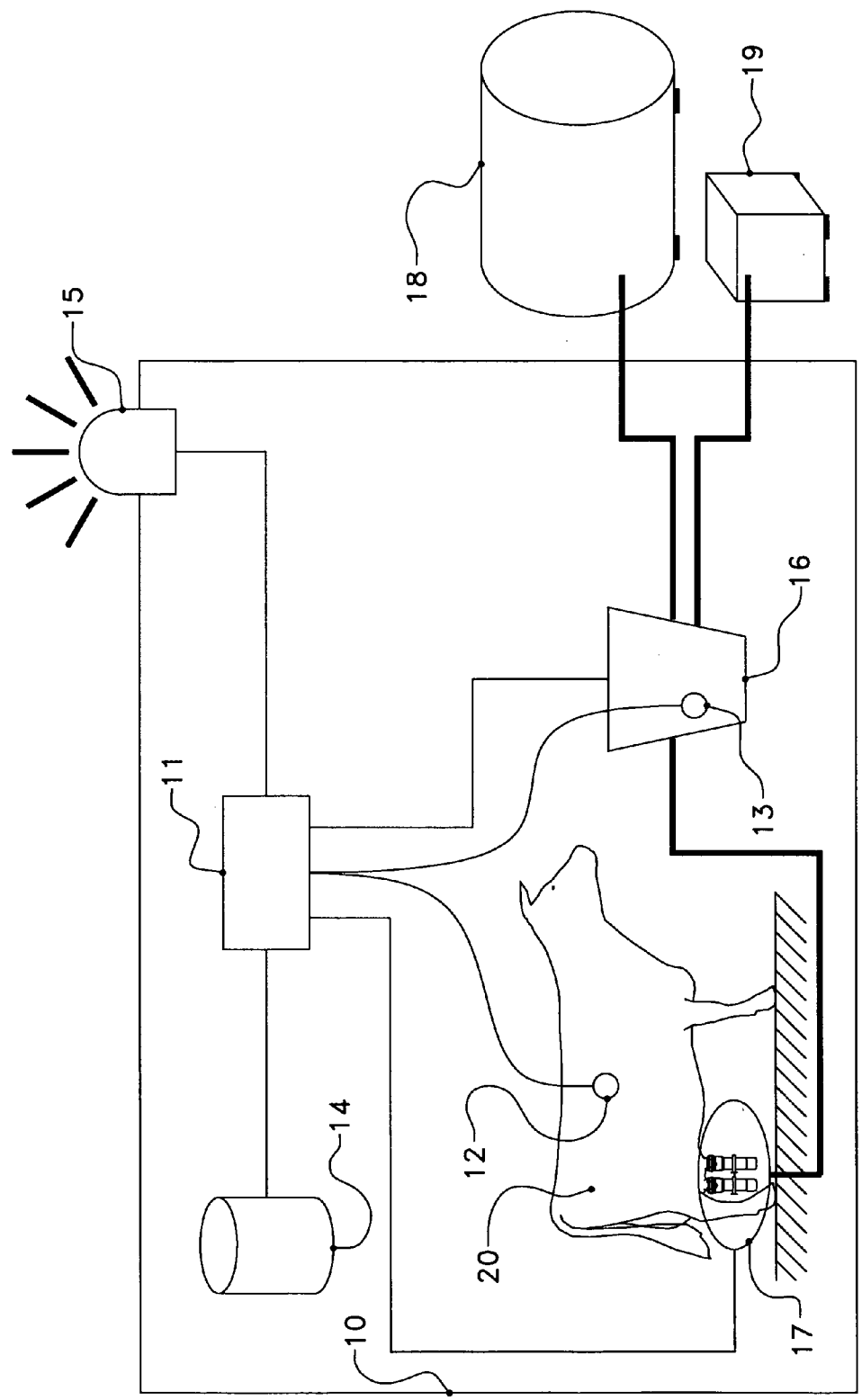

| | | | |
|---|---|---|---|
| 5,988,106 A * | 11/1999 | van den Berg | 119/51.02 |
| 5,992,347 A * | 11/1999 | Innings et al. | 119/14.07 |
| 6,089,242 A * | 7/2000 | Buck | 134/57 R |
| 6,307,362 B1 * | 10/2001 | Mangan | 324/71.4 |
| 6,405,672 B1 * | 6/2002 | De Mol et al. | 119/14.15 |
| 7,834,774 B2 * | 11/2010 | Stevens et al. | 340/635 |
| 8,281,745 B2 * | 10/2012 | De Villiers | 119/14.08 |
| 8,789,494 B2 * | 7/2014 | Thompson | 119/14.02 |
| 2004/0121350 A1 | 6/2004 | Anderberg et al. | |
| 2007/0137580 A1 * | 6/2007 | Brown et al. | 119/14.14 |
| 2010/0170445 A1 * | 7/2010 | Gerrit | 119/14.02 |
| 2012/0006270 A1 * | 1/2012 | Bosma | 119/14.02 |
| 2012/0125262 A1 * | 5/2012 | Van Der Tol | 119/14.14 |
| 2013/0019806 A1 * | 1/2013 | De Groot | 119/14.02 |

\* cited by examiner

DEVICE, METHOD AND COMPUTER PROGRAM PRODUCT FOR MILKING ANIMALS

The invention relates to an automated device for milking animals and a method of generating an attention value in such a device.

In known automated milking systems, different sensors are used for measuring a condition of the animal to be milked and/or for measuring characteristics of milk from the animal to be milked. On the basis of the values measured by said sensors, it can be determined whether or not the animal in question should be milked or whether or not the milk extracted from the animal is fit for consumption. When a measured parameter exceeds a specific limit value, there is generated an attention value and it can be decided not to milk the animal or not to use the extracted milk for consumption.

A disadvantage of the known systems is that when too few sensors are used the chance of false positives becomes too great; there is supplied an attention value while in fact there is nothing wrong. This problem can be solved by making use of a greater number of sensors, in which case there is only generated an attention value when a plurality of measured parameters exceed specific limit values. However, a problem when using a plurality of sensors is that the chance of false positives increases; although the milk from the animal in question should not be used, no attention value is generated, milking of the animal does take place and the milk is used for consumption. In order to optimise the reliability of a generated attention value, the choice is made to use a number of sensors with associated limit values, in which case both the number of false positives and the number of false negatives can be limited to a maximum extent.

The invention aims at providing an automated device for milking animals, wherein attention values are generated in a more reliable manner.

The object is achieved by means of a device as described in claim 1.

The object of the invention is also achieved by means of a device as described the claims. The automated device for milking animals comprises at least two sensors for measuring at least two parameters, respectively, of an animal to be milked, and a processor that is operatively coupled to the at least two sensors. In this case, the processor is configured for comparing the measured parameters with respective absolute limit values, and for generating an attention value when a first specific number ($A_1$) of the measured parameters exceed the respective absolute limit values. The device further comprises a signalling element, coupled to the processor, for indicating a representation of the attention value. The processor is further configured for comparing at least one of the measured parameters with a respective adjusted limit value and for generating the attention value when a second specific number ($A_2$) of the measured parameters exceed the respective absolute limit values and a third specific number ($A_3$) of the measured parameters exceed the respective adjusted limit values. In this case, $A_1 \geq 1$, $A_2 < A_1$, $A_3 \geq 2$ if $A_2=0$ and $A_3 \geq 1$ for all other values of $A_2$.

In this application, by adjusted limit value is meant a limit value that is less strict than the absolute limit value of the same parameter, and which less strict parameter is consequently exceeded sooner. Where an absolute limit value indicates a "red area", immediately resulting in an attention value, the adjusted threshold value can be compared with an "orange area", giving cause for a further examination, in this case for searching other orange areas. It should be noted that, in this case, by "adjusted limit value" is not meant that during performing the method another limit value is chosen dynamically, but that said adjusted limit value has a predetermined value. Although the user of the method can determine said values himself and, therefore, be more strict or less strict per parameter, the point is that the absolute and adjusted threshold values are previously determined.

The device according to the invention makes use of a plurality of sensors, without an increasing chance of false negatives. This is in particular due to a selective use of absolute and adjusted limit values. When only one sensor is used, the measured parameter only has to exceed the absolute limit value in order to cause the attention value. When by adding, for example, a second and third sensor for all parameters, the standard absolute limit values would be applied, the chance of false negatives could become too great. According to the invention, for that reason an adjusted limit value is used for at least a part of the sensors. For example, the choice can be made to generate an attention signal also in the case of exceeding one absolute and three adjusted limit values. With the device according to the invention, adding an extra sensor thus results in an enhanced reliability of generated attention signals without an increased percentage of false negatives.

In one embodiment of the device according to claim 2, the comparing with the adjusted limit value only takes place when at least the second specific number ($A_2$) of the measured parameters exceed the respective absolute limit values. In this embodiment, the comparing of the measured parameters with the different limit values is carried out in two steps. First it is looked at how many parameters exceed the respective absolute limit values. Only when this number is found to be less than $A_1$ but more than $A_2$, the parameters that were found to be smaller than the respective absolute values are compared with their respective adjusted limit values. If more than $A_3$ of these parameters exceed their respective adjusted limit values, an attention value is still generated.

In another embodiment of the device according to the invention, all measured parameters are immediately compared with their respective absolute and adjusted limit values. After counting the number of parameters that exceed the respective absolute and adjusted limit values, it is determined whether an attention value should be generated.

In a special embodiment of the device according to the invention $A_1=1$, $A_2=0$ and $A_3 \geq 2$. In this embodiment, an attention value is thus generated if either one parameter exceeds the absolute limit value, or two or more parameters exceed the adjusted value.

These and other aspects of the invention will be clarified by and explained with reference to embodiments described below.

Figure 2:
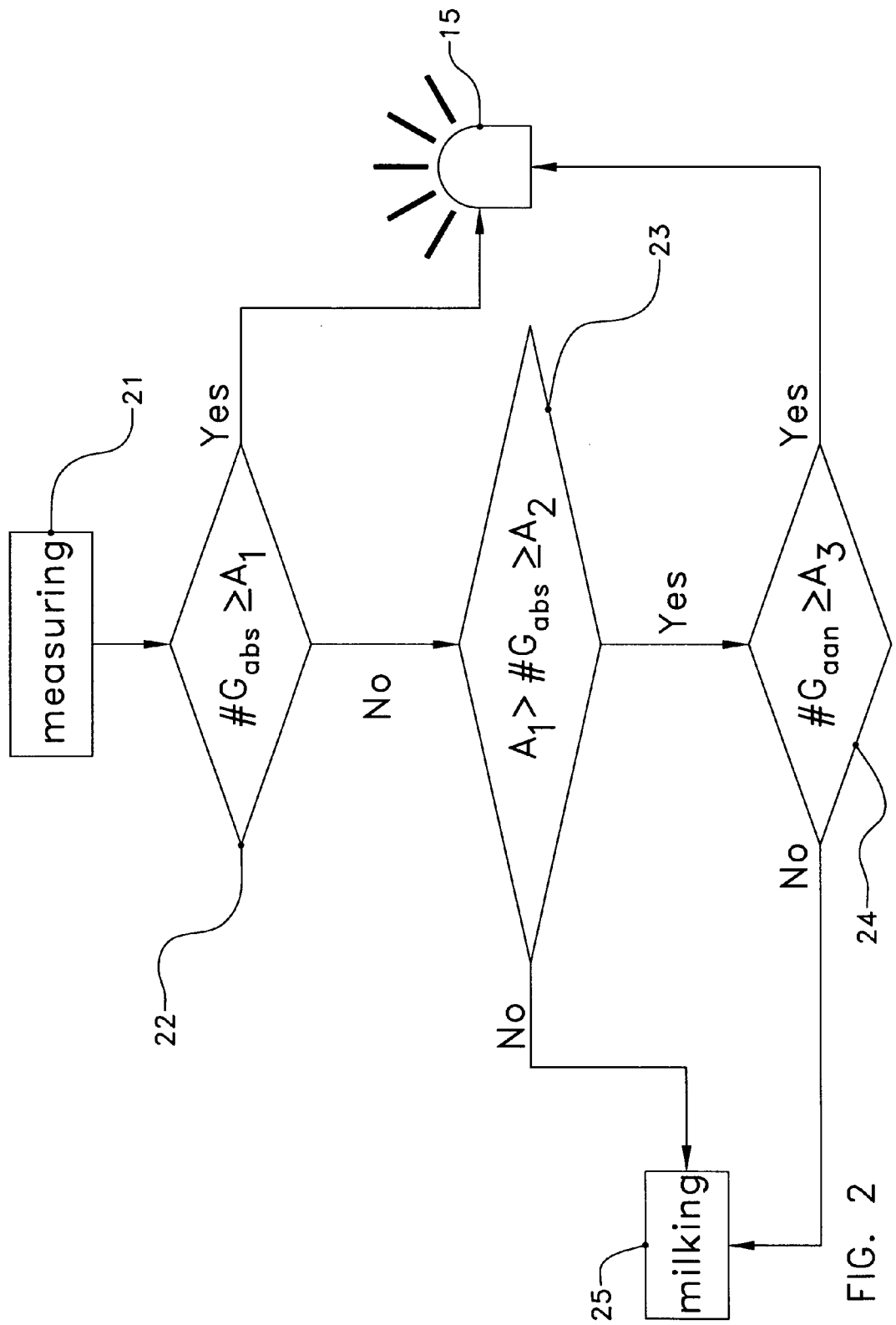
Figure 3:
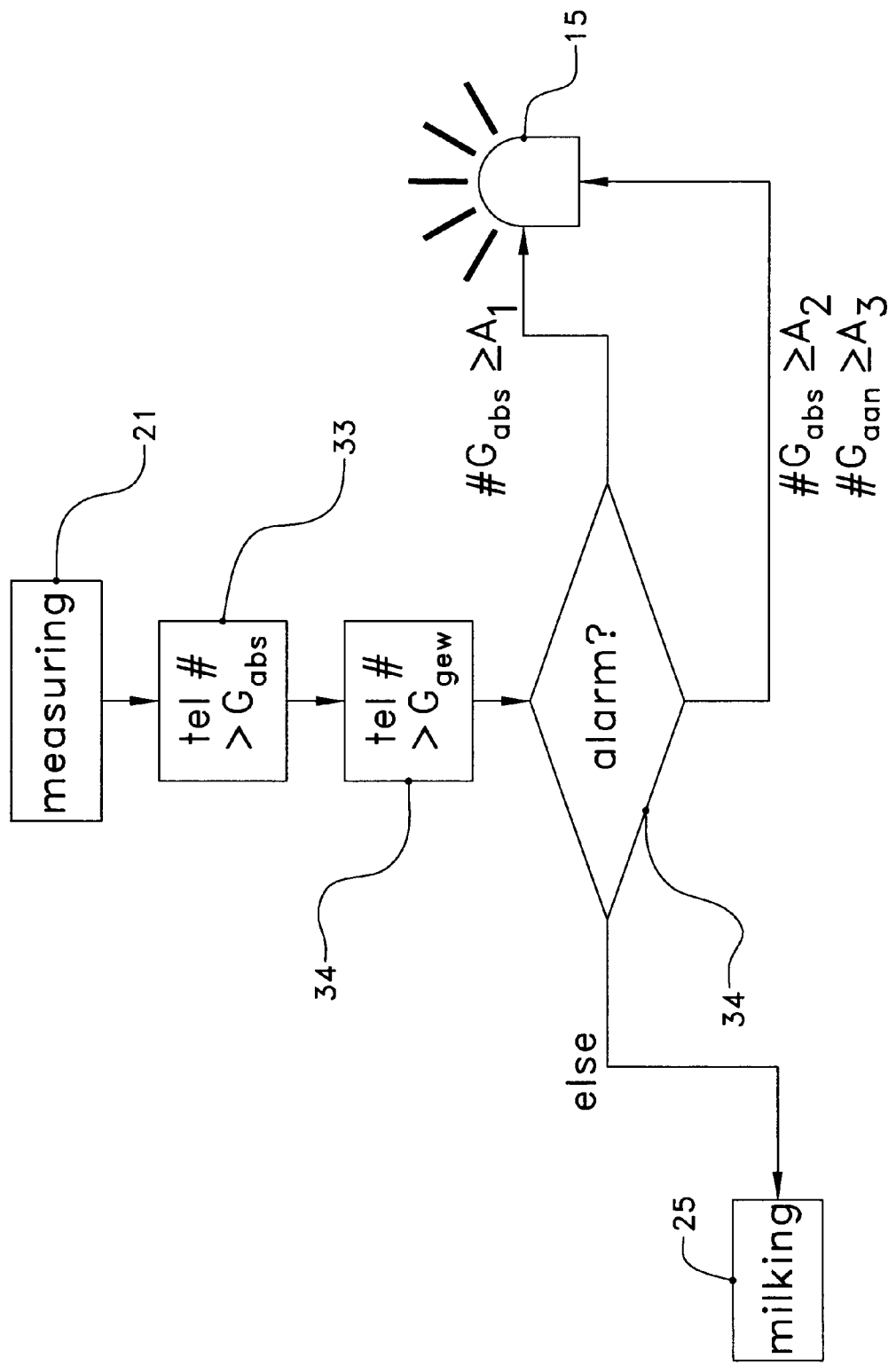

FIG. 1 shows schematically an embodiment of a device according to the invention, FIG. 2 shows a flowchart of a method according to the invention, and FIG. 3 shows a flowchart of another method according to the invention.

The figures are schematic and are not drawn to scale. Some dimensions have been exaggerated for illustrative purposes. Identical elements in the drawings are, as far as possible, denoted by the same reference numerals.

FIG. 1 shows schematically an embodiment of a device 10 according to the invention. The automated device 10 for milking animals 20 comprises teat cups 17 or other means for receiving milk from the teats of the animal 20 to be milked. The teat cups 17 are coupled to a processor 11 for controlling the teat cups 17. The device 10 is preferably provided with a robot arm (not shown) which attaches the teat cups 17 to the teats under the control of the processor 11 in order to enable the milking of the animal 20. The milk obtained can be led directly to a milk tank 18, but is preferably first received in a milk reservoir 16.

The device 10 also comprises sensors 12, 13 for measuring different parameters. The figure shows two sensors 12, 13, but can also make use of more than two sensors 12, 13 in order to be able to measure more parameters and to further enhance the reliability of the device. An animal sensor 12 can measure a physical condition or behaviour parameter of the animal 20 to be milked. Examples of physical parameters to be measured are body temperature, heart beat and blood pressure. The animal sensor 12 can also be able to determine whether the animal 20 suffers from mastitis or other medical conditions.

In addition to illness, heat and rut are also physical conditions that can be taken into account. Apart from that, the animal sensor 12 can be used for measuring parameters that relate to the behaviour of the animal 20 to be milked. The animal sensor 12 can, for example, measure motions of the animal 20, for example with the aid of infrared motion sensors or a video camera with image recognition software. Another way of measuring motion is by making use of leg or neck sensors. Measuring masticating motions can also provide useful information about behaviour and/or condition of the animal. An optional sound sensor could be used to record and interpret sounds produced by the animal. In addition to sensors 12 that carry out measurements on the animal 20, the device may also comprise one or more sensors 13 that carry out measurements on the milk extracted from the animal 20. Such a milk sensor 13 may, for example, be suitable for measuring conductivity, colour, amount, composition or temperature of the milk.

The parameters measured by the sensors 12, 13 are processed by the processor 11. The processor determines whether and when the teat cups 17 can be used for milking the animal 20 and whether the milk temporarily received in the milk reservoir 16 can be passed to the milk tank 18 or should be discharged to a receptacle 19 for milk that is unfit for consumption. Data storage 14 contains data regarding, for example, animals 20 to be milked, desired parameters or previously completed milkings and measured parameters. The data storage 14 is coupled to the processor 11 so that the data stored in the data storage can be used for the functioning of the processor 11, in such a manner that the processor 11 can update and change the data in the data storage 14. An important function of the processor 11 in the device 10 according to the invention is its capability of determining whether an attention value should be generated. The attention value is generated when the sensors 12, 13 provide information indicating that the animal 20 should not be milked or that the milk extracted from the animal 20 should not be offered for consumption. When this attention value is generated, the milking can be interrupted or prevented by the processor 11, or a user can be alerted by the processor 11. For this purpose, the device can, for example, supply an alarm signal by means of an alarm 15, shut off the milk line in the direction of the milk tank 18 or lead the animal 20 away without milking it. Preferably, the generating of the attention value is stored in a file in the data storage 14, and data regarding the animal 20, the moment when the attention value is generated, and the sensor values that gave cause to the generating of the attention value, are also stored together with the attention value.

With reference to FIGS. 2 and 3 it will be elucidated how, according to the invention, it is decided by the processor 11 whether or not to generate an attention value. In both methods, the measured parameters are compared by the sensors 12, 13 with absolute and adjusted limit values. In both methods an attention value is also generated if at least $A_1$ measured parameters exceed the respective absolute limit values or if at least $A_2$ measured parameters exceed the respective absolute limit values, and in addition thereto at least $A_3$ measured parameters exceed the respective adjusted limit values.

It should be noted here that 'exceeding' can mean both that the measured value comes above a minimum limit value and that the measured value comes below a maximum limit value. Whether a limit value indicates a minimum or a maximum depends on the measured parameter and the selected unit in which the measured parameter is expressed. Some limit values can also have a minimum and a maximum limit value. The desired temperature of the milk, for example, can be between a minimum and a maximum value. The adjusted limit values are less strict than the absolute limit values. This means that adjusted limit values are exceeded sooner and more frequently than absolute limit values. Depending on the type of parameter, the adjusted limit value is thus higher or lower than the absolute limit value.

Furthermore, it is important to point out that by 'exceeding the adjusted limit value' is meant that the adjusted limit value is exceeded, but that the absolute limit value is not exceeded. Consequently, parameters that exceed the absolute limit value are not taken into account for determining how many measured parameters exceed the adjusted limit value.

FIG. 2 shows a flowchart of a method according to the invention. The method starts with a measuring step 21 for measuring two or more parameters. In this embodiment, the comparing with the adjusted limit value ($G_{aan}$) only takes place when at least the second specific number ($A_2$) of the measured parameters exceed the respective absolute limit values ($G_{abs}$). After measuring the parameters, in step 22 it is first looked at how many parameters exceed the respective absolute limit values. If more than $A_1$ parameters exceed the absolute limit value, an attention value is generated. If less than $A_1$ parameters are found to exceed the absolute limit value, it is determined in step 23 if more than $A_2$ parameters exceed the absolute limit value. If this is not the case, the milking 25 of the animal can be started. If more than $A_2$ parameters are found to exceed the absolute limit value, a last comparison 24 is still required to determine how many parameters exceed the respective adjusted, less strict, limit values. If this number is more than $A_3$, the attention value is still generated. In the case of less than $A_3$ parameters that exceed the adjusted limit values, the milking 25 can simply be started.

FIG. 3 shows a flowchart of another method according to the invention. This method, too, starts with a measuring step 21. In this embodiment, all measured parameters are immediately compared with their respective absolute ($G_{abs}$) and adjusted ($G_{aan}$) limit values in two successive steps 32, 33. After counting 32, 33 the number of parameters that exceed the respective absolute and adjusted limit values, in deciding step 34 it is determined whether an attention value should be generated. The criteria as already described extensively in the foregoing are used for this purpose.

It should be noted that the aforementioned embodiments describe and do not limit the invention, and that it is possible for the person skilled in the art to design many alternative embodiments without essentially deviating from the accompanying claims.

Reference numerals which are added in brackets in the claims must not be regarded as limitations in the claims. The use of the verb "comprise" and its conjugations does not exclude the existence of elements or steps other than those specified in the claims. The article "a" preceding an element or step does not exclude the existence of a multiplicity of such elements or steps. A plurality of means listed in a device claim may be implemented in one and the same device. The sole fact that specific measures are listed in different dependent claims does not indicate that a combination of these measures is not advantageous.

The invention claimed is:

1. An automated device for milking animals, the device comprising:
   at least two sensors for measuring at least two parameters, respectively, of an animal to be milked, and outputting measured parameters,
   a processor which is operatively coupled to the at least two sensors, wherein the processor is configured for:
   comparing the measured parameters with respective absolute limit values, and
   generating an attention value when there is a first specific number ($A_1$) of the measured parameters that exceed the respective absolute limit values, and
   a signalling element, coupled to the processor, for indicating a representation of the attention value, wherein the processor is further configured for:
   comparing at least one of the measured parameters with a respective adjusted limit value, and
   generating the attention value when there is a second specific number ($A_2$) of the measured parameters that exceed the respective absolute limit values and there is a third specific number ($A_3$) of the measured parameters that exceed respective adjusted limit values, and wherein:
   $A_1 \geq 1$,
   $A_2 < A_1$,
   $A_3 \geq 2$ if $A_2 = 0$, and
   $A_3 \geq 1$ for all other values of $A_2$.

2. The automated device for milking animals as described in claim 1, wherein the processor is further configured for comparing with the adjusted limit value, only when there is at least the second specific number ($A_2$) of the measured parameters that exceed the respective absolute limit values.

3. The automated device for milking animals as described in claim 1, wherein at least one of the measured parameters relates to milk from the animal to be milked.

4. The automated device for milking animals as described in claim 1, wherein at least one of the measured parameters relates to a physical condition of the animal to be milked.

5. The automated device for milking animals as described in claim 1, wherein at least one of the measured parameters relates to behaviour of the animal to be milked.

6. The automated device for milking animals as described in claim 1, wherein:
   $A_1 = 1$,
   $A_2 = 0$, and
   $A_3 \geq 2$.

7. The automated device for milking animals as described in claim 1, wherein $A_2$ has at least two different values and wherein for each value of $A_2$, $A_3$ has a corresponding value.

8. The automated device for milking animals as described in claim 1, wherein the respective adjusted limit value is a raised upper limit or a lowered lower limit.

9. A method of generating an attention value in an automated device for milking animals, the method comprising:
   measuring at least two parameters of an animal to be milked,
   comparing, via a processor, the measured parameters with respective absolute limit values,
   generating, via the processor, an attention value when there is a first specific number ($A_1$) of the measured parameters that exceed the respective absolute limit values, and
   indicating a representation of the attention value, wherein the method further comprises:
   comparing, via the processor, at least one of the measured parameters with a respective adjusted limit value,
   generating, via the processor, the attention value when there is a second specific number ($A_2$) of the measured parameters that exceed the respective absolute limit values and there is a third specific number ($A_3$) of the measured parameters that exceed respective adjusted limit values, and wherein:
   $A_1 \geq 1$,
   $A_2 < A_1$,
   $A_3 \geq 2$ if $A_2 = 0$, and
   $A_3 \geq 1$ for all other values of $A_2$.

10. The method according to claim 9, wherein the comparing with the adjusted limit value only takes place when there is at least the second specific number ($A_2$) of the measured parameters that exceed the respective absolute limit values.

11. A non-transitory, tangible computer data storage medium coupled to an electronic processor, said processor containing an executable computer program configured to have said program perform the method set forth in any one of claims 9 or 10.

* * * * *